UNITED STATES PATENT OFFICE.

MARCELLUS C. COCHRAN, OF COTTAGE GROVE, OREGON.

PROCESS FOR MAKING HALF-TONE CUTS.

No. 878,505.

Specification of Letters Patent.

Patented Feb. 11, 1908.

Application filed January 26, 1907. Serial No. 354,226.

*To all whom it may concern:*

Be it known that I, MARCELLUS C. COCHRAN, a citizen of the United States, residing at Cottage Grove, county of Lane, and State of Oregon, have invented certain new and useful Improvements in Processes for Making Half-Tone Cuts, of which the following is a specification.

My invention relates to processes for making half-tone cuts.

The object of the present invention is the provision of a process whereby half-tone cuts may be rapidly, inexpensively, and easily made and the plate or film which has been prepared by the process may be used to directly print on the paper.

In carrying out my new process, first; expose any ordinary dry plate through a screen and the picture or design. The plate is developed and treated as any photographic negative.

Second; take a plate of glass, wood, film, or metal, which is provided with the usual emulsion as on ordinary photographic plates; expose it to the light through the negative already made.

Third; the plate is then treated to a bath, in the following proportions. Water, five ounces. Carbonate of soda, one half ounce. Sulfite of soda, one fourth ounce. Pyrogallic acid, thirty grains. Oxoltic acid, two grains.

Fourth; then treat to the following bath for the period of five minutes. In proportion, Water, sixty four ounces. Cyanid of potassium, three ounces. Chlorid of silver, one fourth ounce.

Fifth; dry the plate at, one hundred and ten degrees, Fahrenheit, and the cut is ready to mount for use.

The chemical reactions with the emulsion of the plate or film is such that the emulsion is solidified and the shadows raised so that the plate or film will receive ink and print as an ordinary half-tone. After treatment of the film or plate by the chemical baths as aforesaid, and dried said film or plate is mounted on a wood base and is ready for use in the printing press to print direct on the paper.

With my process the plate or film itself serves as the cut and may be prepared ready for use in the press within thirty minutes after the plate or film has been exposed in the camera, thereby saving a very great amount of time heretofore lost in making half-tone cuts beside reducing the cost to only a few cents.

Having thus described my invention, what I claim as new and desire to secure by Letters Patent, is:—

The process of making half-tone cuts consisting in taking a photographic impression on an ordinary emulsionized photographic film, plate or other substance, and thereafter subjecting said negative to successive baths, the first consisting of water, carbonate of soda, sulfite of soda, pyrogallic acid and oxoltic acid, and the second consisting of water, cyanid of potassium, and chlorid of silver, to thereby solidify the emulsion and raise the shadows of the negative.

In testimony whereof, I hereunto affix my signature in presence of two witnesses.

MARCELLUS C. COCHRAN.

Witnesses:
 JEROME KNOX,
 REN SANFORD.